July 10, 1951    J. S. ALSPAUGH    2,559,922

TRANSMISSION

Filed Jan. 3, 1947

INVENTOR.
James S. Alspaugh
BY
McCrady & Wilson
ATTORNEYS.

Patented July 10, 1951

2,559,922

UNITED STATES PATENT OFFICE 2,559,922

TRANSMISSION

James S. Alspaugh, Portsmouth, Ohio

Application January 3, 1947, Serial No. 720,052

4 Claims. (Cl. 74—732)

*Torque responsive transmission*

This invention relates to a torque responsive transmission, and more particularly to a mechanical device for transmitting power from a driving shaft to a driven shaft in such manner that the speed ratio of the driven shaft relative to the driving shaft is dependent on the torque applied to the driving shaft with reference to the load to which the driven shaft is subjected.

An object of the invention is to provide an infinitely variable mechanical transmission having driving and driven shafts interconnected by mechanical gearing which is controlled in such manner that the ratio of speed may vary in proportion to variations in the torque and load to which the driving and driven shafts are subjected.

A further object of the invention is to provide a mechanical transmission including a fluid clutch and including aligned driving and driven shafts interconnected by planetary gearing which is rotatably mounted in a frame carried by the driven member of the fluid clutch, the frame being controlled by said clutch in such manner that it may move relative to a stationary member to vary the torque and speed ratios of the driving and driven shafts.

Still another object of the invention resides in the provision of a transmission having gear-connected shafts wherein means are provided for controlling the speed of rotation of the gear carriers and gears to vary the torque transmitting characteristics of the transmission.

A further object of the invention is to provide a gear of the type indicated wherein the operator may, when on downgrade, utilize the braking effect of the vehicle engine to decelerate the vehicle.

Figure 1:
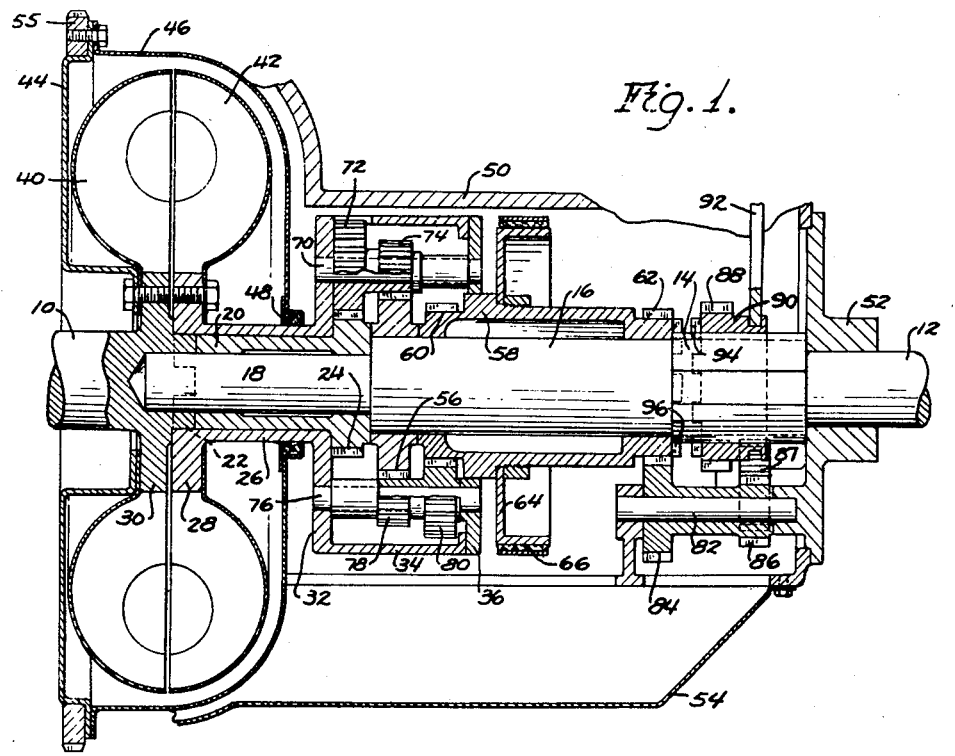
Figure 2:
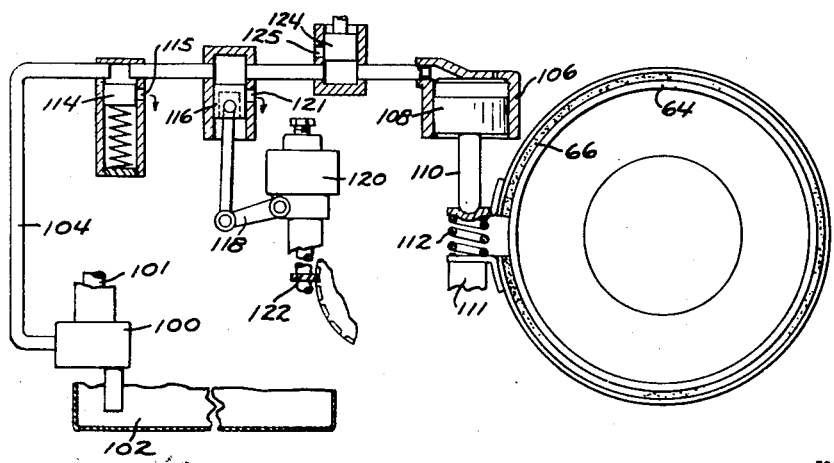

Further objects and advantages of the invention will be apparent from the following description, taken in connection with the appended drawing, wherein:

Fig. 1 is a longitudinal sectional view of a transmission embodying the invention; and Fig. 2 is a diagrammatic view in section of the apparatus for controlling the brake shown in Fig. 1.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In the device illustrated in Fig. 1, the power or driving shaft 10 is adapted to be connected to any suitable source of power, such as the engine of an automotive vehicle. Aligned with the power shaft 10 is a final driven shaft 12, which may be connected through a differential, not shown, to the driving wheels of the vehicle. The forward end of the shaft 12 is formed with an enlarged splined section 14, a plane cylindrical section 16, and an axial extension 18 which is rotatable in an axial bore formed in the power shaft 10. Rotatably mounted on the extension 18 is a sleeve 20 which is secured by means of clutch teeth 22 to the shaft 10, the latter being formed with corresponding dental teeth which with teeth 22 form a permanent connection between the two members. At the other end of sleeve 20 is formed a driving sun gear 24 for a purpose hereinafter explained. Rotatable on the sleeve 20 is a second sleeve 26, formed at its forward end with a flange 28 which matches a similar flange 30 formed on the power shaft 10. The rear end of the sleeve 26 is formed with a radial flange 32 and a cylindrical portion 34. A disc 36 is secured to the portion 34 and serves to form therewith a casing for the planetary gears hereinafter described.

Secured to the flanges 30 and 28 respectively are the impeller element 40 and the turbine element 42 of a fluid clutch of known type, which acts in the known manner to exert a torque upon the sleeve 26 proportionate to the speed of the engine and to the load upon the turbine element. Secured to the flange 30 is a housing for the fluid clutch, made up of a plate 44 and an element 46 which has an oil seal 48 rotatably engaging the sleeve 26. In addition, the entire mechanism may be enclosed within a gear case 50 which is formed at 52 with a journal for the driven shaft 12. A pan 54 is secured to the under side of the case 50. A flywheel 55 may be secured to the periphery of plate 44, to be engaged by the engine starter in the usual manner.

An idler gear 56 is rotatably mounted on the central section 16 of shaft 12. Immediately posterior to the gear 56 is an intermediate shaft in the form of a sleeve 58 which is formed at its forward end with a gear 60 and at its rear end with a gear 62. The intermediate shaft or sleeve 58 is freely rotatable on the cylindrical section 16 of the driven shaft 12.

Fixed to the sleeve 58 is a brake drum 64, designed to be engaged by a brake band 66 to prevent creeping of the vehicle at idling speeds of the engine.

A pinion shaft 70 has its ends mounted in flange 32 and disc 36, and carries a sleeve having formed thereon a larger planetary gear 72 which meshes with the driving sun gear 24, and a second smaller planetary gear 74 which meshes with the idler gear 56. A second pinion shaft 76 has its ends mounted in members 32 and 36 opposite the shaft 70 and similarly carries a sleeve upon which are formed a smaller planetary gear 78, which meshes with the idler gear 56, and a larger planetary gear 80 which meshes with the gear 60 on sleeve 58.

A countershaft 82 is journaled in suitable bosses or extensions of the case 50, and carries a sleeve which has formed thereon a larger gear 84 which meshes with gear 62, and a smaller gear 86 which meshes with an idler gear 87. For purpose of producing a reverse drive, the gear 88 is formed upon a sleeve 90 which is splined upon the splined section 14 of the driven shaft 12. A gear shift lever 92 engages the sleeve 90 and is designed to bring the gears 88 and 87 into engagement for this purpose.

The sleeve 90 is formed at its forward end with clutch teeth 94 which, upon movement of the sleeve forwardly, engage corresponding teeth 96 formed on the rear end of sleeve 58, to couple the sleeve to the driven shaft 12 for the purpose of forming a positive connection between the sleeve 58 and the driven shaft 12.

The apparatus for controlling the brake 64, 66 is illustrated schematically in Fig. 2, which shows the parts in the positions which they occupy when the brake is applied. The apparatus comprises a fluid pump 100 which is driven through a rod 101 from a moving part of the engine, and is designed to draw oil or other hydraulic fluid from a reservoir 102 and pump it under pressure through a conduit 104 to a cylinder 106, the piston 108 of which is connected by means of a rod 110 to the movable end of brake band 66. The fixed end of brake band 66 is connected to a stationary element 111 of the gear case 50. Any suitable means such as a spring 112 may be employed to urge the brake band 66 to released position. In order to maintain the pressure of fluid in the line at a fairly constant value, a pressure relief valve 114 is inserted in the conduit 104, and operates when high pressures occur to bypass a portion of the fluid through a port 115 and back to the reservoir 102. In order to vary the pressure of fluid in accordance with engine speed, a second valve 116 is placed in the line in series with valve 114 and is moved by means of a lever 118 and a governor 120 toward its lower position as the speed of the engine increases, so as to bypass the fluid through a port 121 back to the reservoir 102 and thereby release the brake partially or completely at engine speeds above idling speed. The governor may be of any suitable type, and is connected by gearing 122 to a moving part of the engine, such as the cam shaft. In order to permit the operator to vary the fluid pressure manually and thereby release the brake, as for towing, a manual valve 124 is also placed in the conduit 104 and is operative to bypass fluid through a port 125.

The operation of the apparatus is as follows:

Assume that the vehicle is stationary, the driven shaft 12 also being stationary, and that the motor of the vehicle is operating at idling speed, rotating the shaft 10 and the impeller 40, while clutch teeth 94, 96 are in neutral (disengaged) position as shown in Fig. 1, under these circumstances the brake 64, 66 will be applied by the governor 120 so that the sleeve 58 will be held in stationary position. The shaft 10 is rotating in one direction and the sleeve 26, impelled by the reaction of the planetary gears, is rotating in the opposite direction, so that the gear 80 is rolling around the periphery of gear 60, the latter gear acting as a stationary track. In order to propel the vehicle by motive power applied through the present transmission, the operator will actuate lever 92 to cause the clutch teeth 94, 96 to engage. The turbine element 42 will then be connected through the sleeve 26 and the other elements above described to the driven shaft 12, but since little torque is applied through the fluid clutch at idling speeds the reaction of the planetary gears will cause the sleeve 26 to operate in a reverse direction as above noted; that is, if the driving shaft 10 is rotating in the clockwise direction, as viewed from the left in Fig. 1, the shafts 70 and 76 will rotate about shaft 12 in the counterclockwise direction. Thus the driven shaft 12, although lightly urged toward rotation in the clockwise direction, will be held stationary by the brake 64, 66. It will be seen that at this stage the turbine 42 is rotated by the sleeve in a direction opposite to that in which it is urged by the force of the fluid in the fluid clutch.

If now engine speed is increased, the brake 64, 66 will be released by the governor 120 or manual valve 124, and the torque exerted upon the turbine 42 will increase. This will tend to retard the reverse rotation of the turbine 42 and the gear carrier 32, and will correspondingly increase the torque exerted through the gear carrier 32, the sleeve 58, and the clutch teeth 94, 96 to the driven shaft 12 to the point where the driven shaft will exert sufficient torque upon the driving wheels to move the vehicle. The transmission is then operating at a high reduction ratio, being in effect in low gear. As the vehicle speed increases, or the torque required to turn the driven shaft 12 decreases, the fluid clutch will further retard the reverse rotation of the gear carrier 32, which will further decrease the reduction ratio through the transmission. When the speed and torque are at such value that the gear carrier 32 remains stationary, the effective reduction is through the gears 24, 72, 74, 56, 78, 80 and 60, giving an intermediate speed.

Further reduction of the torque required to turn the driven shaft, or further increase in the motor speed, will cause the turbine 42 of the fluid clutch to begin to rotate in the same direction as the impeller 40. If the elements 40, 42 of the fluid clutch were to rotate at the same speed, the planetary gears would not turn on their axes, but would simply move about the shaft 12 in a planetary manner in the clockwise direction, and the transmission would then be in direct drive. However, the fluid clutch will at all times permit a slight slippage, and this will cause a slight reduction of gear ratio in the transmission such as is characteristic of a transmission which includes a fluid clutch.

In order to produce a reverse drive, the operator will move the sleeve 90 rearwardly, thus disengaging the clutch teeth 94, 96, and moving the parts to the point where the gear 88 engages the gear 87, which will produce rotation of the driven shaft 12 in a direction opposite to that above described. This is in effect simply the conventional reverse gearing. It will be noted, however, that the transmission is torque responsive even when in reverse.

It will be seen that the transmission may be used not only in automobile vehicles but in power hoists and wherever an infinitely variable transmission is desired.

For purposes of considering the action of the transmission, the gear train comprising gears 24 and 72 may be referred to as train one, the train comprising gears 74, 56, and 78 as train two, and the train comprising gears 80 and 60 as train three. Using this terminology, rotation of drive shaft 10 and pinion gear 24 of train one is transmitted to planet gears 72 and 74. These gears are carried by gear carrier 32 and are connected to the idler sun gear 56 of train two. Thereby rotation of planet gears 72 and 74 against the idler sun gear 56 and against train two will rotate backwardly the gear carrier 32, which carries the pinion gears 78 and 80. Thus backward rotation of planet gear 74 rotates planet gear 72 backwardly around the driving sun gear 24 as the latter rotates planet gears 72 and 74. Gear carrier 32 wil rotate planet gear 78 around sun gear 56 of train two. This rotation of planet gear 78 by the gear carirer 32 is transmitted to planet gear 80, which is meshed with gear 60 of train three secured to driven shaft 12.

Although the invention has been described with particular reference to the illustrated embodiment thereof, it may be embodied in other forms within the skill of artisans in this art, and is not limited except by the terms of the following claims.

I claim:

1. In a transmission having a driving shaft, an intermediate shaft, a final driven shaft, sun gears fixed to the driving and intermediate shafts, a fluid coupling having an impeller fixed to the driving shaft, a turbine associated with the impeller and adapted to be driven thereby, a planetary gear train having a carrier operably connected to the turbine, an idler gear, pinion gears mounted in the carrier and interconnecting the sun gear fixed to the driving shaft and said idler gear, additional pinion gears mounted in the carrier and interconnecting the idler gear and the sun gear fixed to the intermediate shaft, a source of fluid pressure, a brake for the intermediate shaft, fluid pressure actuated means operable at slow speeds of the driving shaft to actuate said brake to lock the intermediate shaft against rotation, and speed responsive means operated by an increase of speed of the driving shaft to release said brake.

2. In a transmission, a driving shaft, an intermediate shaft, a final driven shaft, a sun gear fixed to the driving shaft, a sun gear of larger diameter fixed to the intermediate shaft, an idler sun gear of still larger diameter rotatably mounted between the sun gears fixed to the driving and driven shafts, a planet carrier having a set of pinion gears of large and smaller diameters meshing with the sun gear fixed to the driving shaft and with the idler sun gear respectively and having another set of pinion gears of small and larger diameters meshing with the idler sun gear and with the sun gear fixed to the intermediate shaft respectively, a fluid coupling having an impeller fixed to the driving shaft and a turbine fixed to the planet carrier, a source of fluid pressure, a brake for the intermediate shaft, fluid pressure actuated means operable at slow speeds of the driving shaft to actuate said brake to lock the intermediate shaft against rotation, and speed responsive means operated by an increase of speed of the driving shaft to release said brake.

3. In a transmission, a driving shaft, an intermediate shaft, a final driven shaft, a sun gear fixed to the driving shaft, a sun gear of larger diameter fixed to the intermediate shaft, an idler sun gear of still larger diameter rotatably mounted between the sun gears fixed to the driving and intermediate shafts, a planet carrier having one set of pinion gears of large and smaller diameters meshing with the sun gear fixed to the driving shaft and with the idler sun gear respectively, and having another set of pinion gears of small and larger diameters meshing with the idler sun gear and with the sun gear fixed to the intermediate shaft respectively, and a fluid coupling having an impeller fixed to the driving shaft and a turbine fixed to the planet carrier to control the speed ratio by retarding reverse rotation of the carrier produced by said different sized sun gears as the speed of the impeller increases.

4. In combination with driving and intermediate shafts of a transmission for a motor vehicle having sun gears fixed to the driving and intermediate shafts, a fluid coupling having an impeller fixed to the driving shaft, a turbine associated with the impeller and adapted to be driven thereby, a planetary gear train having a carrier operably connected to the turbine, an idler gear, pinion gears mounted in the carrier and interconnecting the sun gear fixed to the driving shaft and said idler gear, additional pinion gears mounted in the carrier and interconnecting the idler gear and the sun gear fixed to the intermediate shaft, a source of fluid pressure, a brake for the intermediate shaft, means operable by said fluid pressure at slow speeds of the driving shaft to actuate said brake to lock the intermediate shaft against rotation to prevent movement of the vehicle under idling conditions, and speed responsive means operated by an increase of speed of the driving shaft to release said brake.

JAMES S. ALSPAUGH.

REFERENCES CITED

The following references are of record in the file of this patent:

UNITED STATES PATENTS

| Number | Name | Date |
|---|---|---|
| 1,203,265 | Radcliffe | Oct. 31, 1916 |
| 1,242,974 | Pinckney | Oct. 16, 1917 |
| 2,129,884 | Swan | Sept. 13, 1938 |
| 2,277,214 | Dodge | Mar. 24, 1942 |
| 2,284,934 | Watson | June 2, 1942 |
| 2,333,674 | Powell | Nov. 9, 1943 |
| 2,408,008 | Tipton | Sept. 24, 1946 |

FOREIGN PATENTS

| Number | Country | Date |
|---|---|---|
| 393,295 | Great Britain | May 30, 1933 |
| 442,562 | Great Britain | Feb. 11, 1936 |